United States Patent
Bernath

(10) Patent No.: US 9,602,437 B1
(45) Date of Patent: Mar. 21, 2017

(54) SYSTEM AND METHOD FOR ACCELERATING NETWORK APPLICATIONS USING AN ENHANCED NETWORK INTERFACE AND MASSIVELY PARALLEL DISTRIBUTED PROCESSING

(71) Applicant: Tracey M. Bernath, Leawood, KS (US)

(72) Inventor: Tracey M. Bernath, Leawood, KS (US)

( * ) Notice: Subject to any disclaimer, the term of this patent is extended or adjusted under 35 U.S.C. 154(b) by 11 days.

(21) Appl. No.: 14/045,728

(22) Filed: Oct. 3, 2013

Related U.S. Application Data

(60) Provisional application No. 61/709,244, filed on Oct. 3, 2012.

(51) Int. Cl.
*H04L 12/935* (2013.01)
*G06T 1/20* (2006.01)

(52) U.S. Cl.
CPC ............ *H04L 49/3054* (2013.01); *G06T 1/20* (2013.01)

(58) Field of Classification Search
CPC . H04L 49/3054; H04L 49/3072; H04L 49/50; G06T 1/20
See application file for complete search history.

(56) References Cited

U.S. PATENT DOCUMENTS

| | | | |
|---|---|---|---|
| 7,324,112 B1* | 1/2008 | Lindholm et al. | 345/522 |
| 7,746,783 B1* | 6/2010 | Tripathi | H04L 12/4641 370/230 |
| 8,930,595 B2* | 1/2015 | Mayhew | 710/52 |
| 2011/0063285 A1* | 3/2011 | Hoover | G06T 15/005 345/419 |
| 2012/0226804 A1* | 9/2012 | Raja | H04L 43/028 709/224 |
| 2014/0071866 A1* | 3/2014 | Maciocco et al. | 370/311 |

* cited by examiner

*Primary Examiner* — Mohammad Anwar
(74) *Attorney, Agent, or Firm* — Marin Patents LLP; Gustavo Marin

(57) ABSTRACT

A system comprises a network interface to receive a stream of packets from a network, insert each of the packets into a buffer in memory of a graphics processing unit using direct memory access, assign each of the packets an index representing an offset indicating a location in the memory of the graphics processing unit, determine that a pre-configured buffer flow capacity has been reached regarding a first buffer in the graphics processing unit, and transmit an interrupt to the graphics processing unit corresponding to the pre-configured buffer flow capacity regarding the first buffer in the graphics processing unit. The graphics processing unit is connected to the network interface over a bus and starts a first kernel specific to the first buffer in response to the interrupt.

48 Claims, 7 Drawing Sheets

SYSTEM AND METHOD FOR ACCELERATING NETWORK APPLICATIONS USING AN ENHANCED NETWORK INTERFACE AND MASSIVELY PARALLEL DISTRIBUTED PROCESSING

RELATED APPLICATIONS

This application claims the benefit of priority to U.S. Provisional Application No. 61/709,244, filed Oct. 3, 2012, entitled "System and Method for Accelerating Network Applications Using Enhanced Network Interface and Massively Parallel Distributed Processing," the entire contents of which are hereby incorporated herein by reference.

FIELD

The present systems and methods relate generally to parallel processing streams or packets of data received by a network using a graphics processing unit (GPU). Each stream or packet of data is received by a network interface card (NIC) and is assigned to one of a plurality of buffers of memory in the GPU mapped to a specific interrupt by a central processing unit (CPU). The buffer is processed by at least one thread of the GPU, which initiates a kernel to process the packets of data in the buffer.

BACKGROUND

The growth and ubiquity of the Internet has spawned an increase in a number of connected clients as well as the bandwidth of a backhaul required to transport packets between clients and servers. Around 2000, gigabit network cards capable of transmitting data at a rate of a gigabit per second became widely used in the backhaul portions of networks. Network card technology has gradually evolved to the point that backhaul portions of networks utilized 10 gigabit network cards and are now transitioning to 40 gigabit network cards. However, 40 gigabit cards cannot achieve their theoretical bandwidths. In practice, systems cannot fully utilize a 40 gigabit link available on current network cards. Network cards with even larger links are in the process of being developed and being released to the market.

Network cards have inefficiencies related to transfer of data from the network card through a CPU. Network cards and controllers may notify a CPU that incoming packets are received, and the CPU may move data from the network card to memory over the system bus. Outgoing packets are transmitted in a similar manner. When the CPU has packets ready to transmit, the CPU may notify the NIC that there is data to send and transfer the packets over the system bus to the network cards and controllers. Many network controllers communicate over a peripheral component interconnect express (PCIe) bus, which is a high-speed serial bus.

Despite the inability to fully utilize links available on network cards, structured and unstructured data and related traffic continues to grow exponentially. Consumer demand for data services continues to increase at unprecedented levels, and a consumer's experience is optimal when data-related delays are minimized. It is believed that approximately 2.5 billion gigabytes of data are created by the Earth's population each day, and this number continues to double every 40 months. The world's ability to create and store data continues to grow, and a major challenge is related to transportation of this data as well as processing and analyzing the world's data.

Unfortunately, an upload or a download path is only as fast as its most limiting component. The limiting component may be the network, a server, or a disk drive. Although not a long term answer, many have attempted to solve this problem by simply using as much hardware as possible. However, this is inefficient, and the continual need for more hardware resources is no longer as viable of a solution as the volume and velocity of data outgrows the ability of the current hardware to process the data. In short, network throughput of the data is not keeping pace with an increasing amount of data.

SUMMARY

Briefly described, and according to one embodiment, aspects of the present disclosure generally relate to a system and method for accelerating network applications using an enhanced network interface and massively parallel distributed processing whereby a graphics processing unit interacts with other nodes at line speeds without deferring full control to a central processing unit. Packetized data is transferred directly from a network controller or card to a graphics processing unit and processed in the graphics processing unit, bypassing the CPU.

In one aspect, a disclosed system comprises at least one network interface comprising at least one first processor to receive a stream of packets from a network, and insert each of the packets into a buffer in memory of at least one graphics processing unit using direct memory access. The at least one network interface comprising the at least one first processor assigns each of the packets an index representing an offset indicating a location in the memory of the at least one graphics processing unit, determines that a pre-configured buffer flow capacity has been reached regarding a first buffer in the at least one graphics processing unit, and transmits an interrupt to the at least one graphics processing unit corresponding to the pre-configured buffer flow capacity regarding the first buffer in the least one graphics processing unit. The at least one graphics processing unit is connected to the at least one network interface over a bus comprises at least one second processor to start a first kernel specific to the first buffer in response to the interrupt.

In another aspect, a system comprises at least one network interface comprising at least one first processor to receive a stream of packets from a network, split the stream of packets into at least one packet stream subset, insert each packet in each packet stream subset into a buffer in memory of at least one graphics processing unit using direct memory access, assign each of the packets in each packet stream subset an index representing an offset indicating a location in the memory of the at least one graphics processing unit, determine that a pre-configured buffer flow capacity has been reached regarding a first buffer in the at least one graphics processing unit, and transmit an interrupt to the at least one graphics processing unit corresponding to the pre-configured buffer flow capacity regarding the first buffer in the least one graphics processing unit. The at least one graphics processing unit is connected to the at least one network interface over a bus and comprises at least one second processor to start a first kernel specific to the first buffer in response to the interrupt.

In another aspect, a server comprises at least one network interface comprising at least one first processor to receive a stream of packets from a network, insert each of the packets into a buffer in memory of at least one graphics processing unit using direct memory access, assign each of the packets an index representing an offset indicating a location in the memory of the at least one graphics processing unit, determine that a pre-configured buffer flow capacity has been reached regarding a first buffer in the at least one graphics processing unit, and transmit an interrupt to the at least one graphics processing unit corresponding to the pre-configured buffer flow capacity regarding the first buffer in the least one graphics processing unit. The at least one graphics processing unit is connected to the at least one network interface over a bus and comprises at least one second processor to start a first kernel specific to the first buffer in response to the interrupt.

In a further aspect, a system comprises at least one network interface and at least one graphics processing unit communicating over a bus to execute computer-executable instructions to receive a stream of packets from a network by the at least one network interface, insert each of the packets into a buffer in memory of the at least one graphics processing unit using direct memory access, assign each of the packets an index by the at least one network interface representing an offset indicating a location in memory of the at least one graphics processing unit, transmit an interrupt to the at least one graphics processing unit regarding a first buffer in the least one graphics processing unit, and start a first kernel specific to the first buffer in the at least one graphics processing unit in response to the interrupt.

In an even further aspect, a system comprises at least one network interface and at least one graphics processing unit communicating over a bus to execute computer-executable instructions to receive a stream of packets from a network by the at least one network interface, split the stream of packets into at least one packet stream subset by the at least one network interface, insert each packet in each packet stream subset into a buffer in memory of the at least one graphics processing unit using direct memory access, assign each packet in each packet stream subset an index by the at least one network interface representing an offset indicating a location in the memory of the at least one graphics processing unit, transmit an interrupt to the at least one graphics processing unit regarding a first buffer in the least one graphics processing unit, and start a first kernel specific to the first buffer in the at least one graphics processing unit in response to the interrupt.

In an additional aspect, a server comprises at least one network interface and at least one graphics processing unit communicating over a bus to execute computer-executable instructions to receive a stream of packets from a network by the at least one network interface, insert each of the packets into a buffer in memory of the at least one graphics processing unit using direct memory access, assign each of the packets an index by the at least one network interface representing an offset indicating a location in the memory of the at least one graphics processing unit, transmit an interrupt to the at least one graphics processing unit regarding a first buffer in the at least one graphics processing unit, and start a first kernel specific to the first buffer in the at least one graphics processing unit in response to the interrupt.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
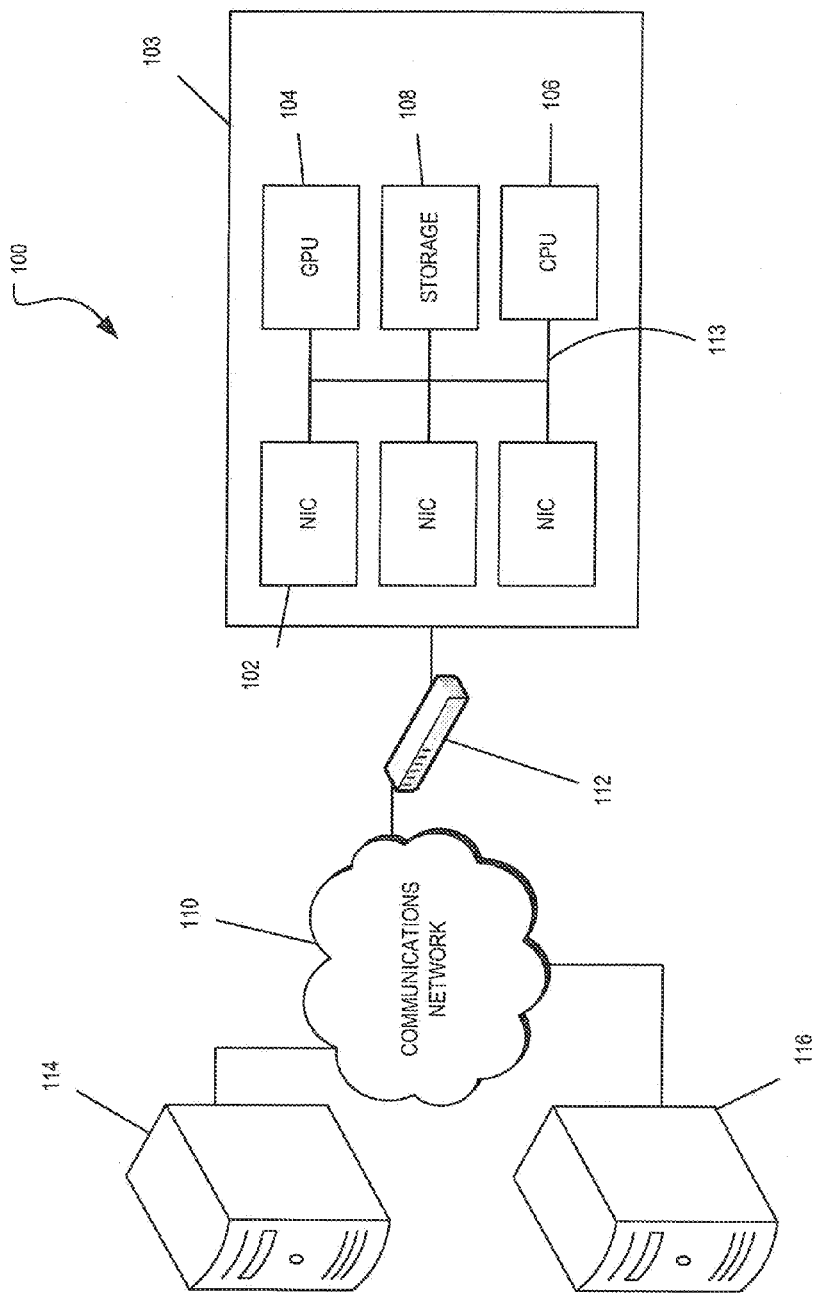
FIG. 1A illustrates a block diagram of components of a system for accelerating network applications using an enhanced network interface and massively parallel distributed processing according to an example embodiment.

For the purpose of promoting an understanding of the principles of the present disclosure, reference will now be made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Embodiments of the disclosure relate to systems and methods that allow data-related applications to avoid inefficiencies associated with traditional transfer of data from a network controller to a CPU over a system bus and enable applications to fully utilize 10 gigabit, 40 gigabit, 100 gigabit, 400 gigabit, and even larger network card line speed capacities. Line speed is a maximum data rate at which information is capable of being transmitted over a connection and/or through a network node, such as a network card. Packetized data is transferred directly from the network controller or card to a graphics processing unit and processed in the graphics processing unit, bypassing the CPU.

Current accelerated software-based packet handling solutions incur latency associated with loading packets into memory on a main CPU, and then transferring the packets over a bus to a GPU. Additional latency in the CPU may result from high context switches between an operating system and an application operating on the packets.

Some software-based methods in use on multicore CPU processing architectures may attempt to mitigate latency by dedicating processing CPU cores to packet processing while remaining CPU processing cores are used by an operating system and application. Another current attempt to eliminate context switches includes the use of "pinned memory" whereby a GPU accesses main memory on demand. Packets are not directly copied to memory in the GPU. An additional current method of reducing latency includes modifying a network driver to allocate a single buffer, and having the driver provide the packets to an application without traversing proper kernel packet handling code. The packets are processed and transmitted to the GPU for accelerated processing.

Network interfaces and operating system drivers have also utilized receive side scaling (RSS) to scale packet delivery by creating multiple independent receive queues within the network interface. Each queue may map to an individual memory location as well as an interrupt. These queues are mapped to an individual core on the CPU and each core will process any traffic in parallel. However, RSS only works for defined traffic filtering (e.g., tuples of Internet Protocol (IP) address, port, etc.).

According to an example embodiment, a network interface card/network controller (NIC) receives a packet and delivers the packet directly into a buffer in memory space of a GPU using direct memory access across a high speed bus, bypassing a CPU.

Before the packet can be delivered directly to the GPU, the CPU initializes buffers, interrupts, and execution kernels. The NIC maps the buffer's status to a specific interrupt, which was assigned by the CPU. Once the buffer is ready for processing, the GPU may receive the interrupt to process the buffer using a kernel specific to the buffer or data in the buffer.

When the GPU has processed the buffer and is ready to transmit data to the network controller, the GPU may notify the NIC that the buffer has been processed by using memory based transaction across the high speed bus. The GPU may deliver the data directly to the NIC using direct memory access bypassing the CPU.

Figure 1B:
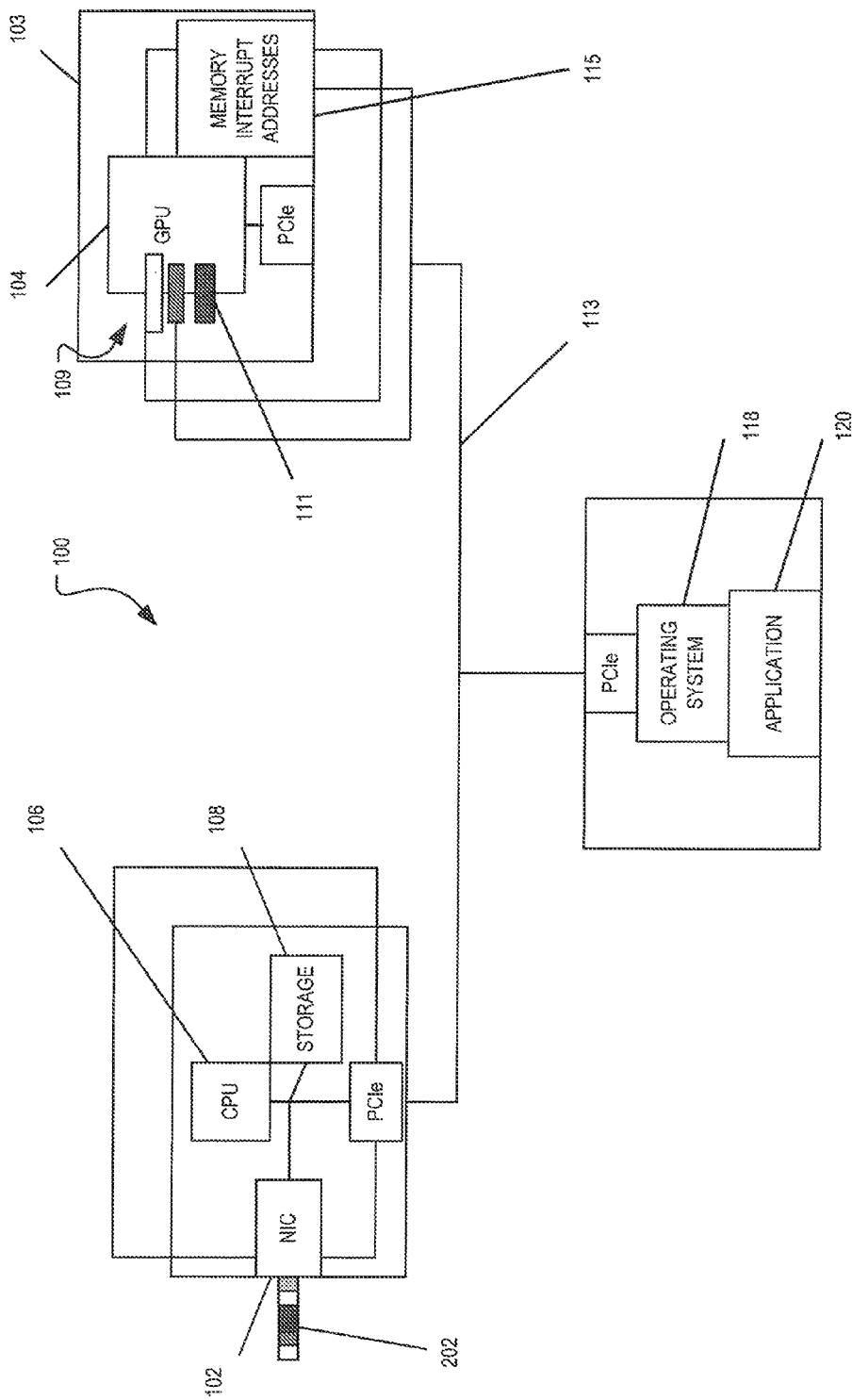
FIG. 1B illustrates an additional block diagram of the components of a system for accelerating network applications using an enhanced network interface and massively parallel distributed processing according to an example embodiment.

FIGS. 1A and 1B illustrate block diagrams of a system for accelerating network applications using an enhanced network interface and massively parallel distributed processing 100 according to an example embodiment. The system 100 includes at least one network interface card (NIC) 102, a graphics processing unit (GPU) 104, a central processing unit (CPU) 106, and optional storage 108.

The NIC 102 determines a type of incoming data and filters incoming data into buffers 109 based on data type. As data is received from a communications network 110 by a switch 112, or other routing device or processing device, the data is fed into the NIC 102.

The data includes packets, and each packet comprises control information, such as information found in a header and a trailer, and payload data, or user data. As an example, for each packet, the header acts as an envelope and the payload comprises information inside of the envelope.

A processor within the NIC 102 executes an algorithm comprising computer-readable instructions to filter each of the incoming packets and place each of the packets into a corresponding buffer. The algorithm analyzes information in the header and/or the payload to determine which buffer the packet should be inserted into. While being received and filtered, each packet is assigned an index by the NIC 102 that indicates where the packet is being stored in memory, the memory being packet buffer memory. Therefore, the NIC 102 receives packets, groups similar packets together, assigns an index to each packet, and stores the similar packets in a particular one of the buffers 109.

The NIC 102 will continue to receive packets and insert the packets into buffers 109 until the NIC 102 determines that a buffer flow capacity has been reached. The buffer flow capacity, for example, is related to a predetermined criterion or a predefined notification level. The NIC 102 monitors the buffer flow capacity for each buffer and if the predetermined notification level has been met regarding a buffer, the NIC 102 will then begin filling a next buffer with packets that match the algorithm. A buffer flow may be ready for processing, for example, when 10 ms have elapsed from receipt of a first packet, a buffer flow may be ready every 10 milliseconds (ms), a buffer flow may be ready when the buffer reaches 10 megabytes (MB), etc. More generally, the buffer flow capacity may also be based, for example, on a percentage of buffer memory used in a first buffer, buffer memory remaining in a buffer, a number of packets currently in a buffer, an elapsed time since a first packet was received in a buffer, and/or an elapsed time since a last packet was received in the first buffer.

Once the predefined criterion or notification level has been met, the NIC 102 notifies a GPU 104 that the buffer is ready for processing. As an option, a status flag may be set by the NIC 102 that indicates that the criterion or notification level is met. The NIC 102 notifies the GPU 104 by transmitting an interrupt that indicates that the buffer is ready for processing. According to an example embodiment, the interrupt is transmitted by the NIC 102 directly to the GPU 104. The NIC 102 may be configured having multiple virtual channels using single root input/output virtualization (SR-IOV) whereby each channel is targeted to a specific GPU destination and has a corresponding interrupt message target. For example, an interrupt destination can be configured at boot time (e.g., by the CPU 106) to be a memory address mapped to a specific location in the GPU 104.

The NIC 102 provides line speed or nearly line speed processing of packets. The NIC 102 may be a programmable NIC and/or a NIC with a field-programmable gate array (FGPA) processor. Thus, the NIC 102 is hardware having at least one processor to execute computer readable or computer executable instructions. The computer readable instructions may be stored in a non-transitory computer readable medium, such as memory, which also is hardware.

The NIC 102 is in communication with at least one GPU 104. According to example embodiments, the GPU 104 receives data in the buffers 109, monitors interrupts associated with the buffers 109, and processes the data in the buffers 109.

As the NIC 102 receives packets and filters the packets into buffers 109, the packets are assigned an index by the NIC 102 and stored directly in GPU memory. This index is used to locate the packets in GPU memory. The NIC 102 stores the buffers 109 directly to the GPU 104 by using direct memory access (DMA). As the packets come into the NIC 102, they are inserted into buffers 109 in GPU memory by the NIC 102 using direct memory access (DMA) via message signaled interrupts (MSI), e.g., MSI-X. MSI or DMA allows a piece of hardware such as the NIC 102 to have access to memory within the GPU 104 independently of a CPU and store the data in the buffers 109 in memory of the GPU. The NIC 102 writes or transmits the interrupts, for example, to interrupt address locations in the GPU 104.

According to example embodiments, the NIC 102 allocates packet buffers within the GPU 104. The NIC 102 writes data to a memory-mapped input/output address (e.g., MSI, MSI-X) and the memory locations for the interrupts may be allocated in GPU memory space. The GPU 104 may receive all network interface information from the NIC 102 without requiring communication from the CPU 106. This may be accomplished by configuring the GPU 104 (e.g., by the CPU 106 or other processing device) to allow access to ranges of memory for the NIC 102 to use as buffers and having the NIC 102 set indexes for inbound and outbound packets.

As noted above, the NIC 102 notifies the GPU 104 when a buffer is ready for processing by sending an interrupt directly to the GPU 104. While running, the GPU 104 continually polls interrupt address locations for interrupts. A first portion of an interrupt handler on the GPU 104 polls the interrupt address locations for updates to the memory and in the event of an interrupt, retrieves data from a memory location, and may execute limited pre-processing, e.g., copying memory which is available for direct memory access into an internal only buffer. This limited pre-processing may be necessary if the GPU 104 does not allow the NIC 102 to have full direct memory access. The first portion of the interrupt handler then deposits the data into a second portion of the interrupt handler. The second portion of the interrupt handler then does more extensive processing, e.g., causing the GPU 104 to spawn a kernel to process packets in a buffer. The interrupt handler also operates in reverse by copying packets from GPU memory to externally accessible memory and then signals the NIC 102 to send the data in the externally accessible memory. If the NIC 102 has sufficient memory to temporarily store the data in externally accessible memory, the data can be pushed to the NIC 102 from GPU memory that is externally accessible.

The GPU 104 monitors interrupt address locations for notifications from the NIC 102 to indicate when packets are available for processing. When an interrupt is received by the GPU 104 (e.g., the GPU 104 determines that an interrupt is present at an interrupt address location), the GPU 104 spawns a kernel corresponding to the interrupt and buffer to process a buffer holding the packets available for processing. An identical set of computer-readable instructions associated with the kernel is executed on each of the packets in the buffer by the GPU 104.

Different computer program tasks are typically carried out by kernels. A kernel is a function executed on a processor, and a typical program running on a processor may include a plurality of kernels. For example, an operating system may comprise a variety of kernels. The index assigned to each packet by the NIC 102 allows multiple threads of the GPU 104 to immediately commence parallel processing of the packets in the buffer. A thread is a subset of a process. Thus, a plurality of threads may exist within a same process and may share resources such as memory. Each thread executing computer-readable instructions associated with a kernel may simultaneously process a different packet within the buffer by locating packets in GPU memory using the index associated with each packet. The GPU 104 has the ability to manage tens of thousands of executing threads. Some threads can sit idle, relinquishing GPU processing to other kernels with data. The interrupt handler in the GPU 104 can wait and monitor memory locations, copy data to other kernels, or initiate entirely new kernels, if supported by the GPU 104.

Multithreading on a multi-core processor such as a GPU allows each processor or processor core to execute kernels simultaneously. Previously, kernels were executed sequentially. However, according to an example embodiment, the GPU 104 supports concurrent kernel execution whereby the GPU 104 may simultaneously execute a plurality of kernels on a variety of different types of data in a plurality of buffers.

As an example, the GPU 104 may simultaneously operate on a plurality of steps in a web protocol by dedicating a buffer and kernel to each step in the protocol, e.g., MSI-X #34 is a TCPSYN kernel and MSI-X #35 is a TCPACK kernel. Thus, the GPU 104 operates by executing many kernels on buffers of data.

When a kernel is invoked, the kernel processes packets in a buffer. The kernel generates results and stores the results in one or more result vectors in GPU memory. The vectors may be used to pass information between kernels for each packet. At each stage, a kernel may generate an output packet that is stored in an output vector. When the kernel completes, the GPU 104 may then spawn one or more kernels to notify the NIC 102 that there are packets available to transmit using MSI-X or other similar interrupting schemes. The NIC 102 may be notified by the GPU 104 that output packets are stored in GPU memory in an output buffer and ready for transmission using DMA. According to an example embodiment, the output packets in GPU memory are sent to the NIC 102 by the GPU 104 while input packets are being stored in GPU memory by the NIC 102.

Thus, the GPU 104 may operate on network packets directly within its processing cores by receiving the packets within GPU memory, processing the packets, storing any output related to processing the packets in an output buffer in GPU memory, creating an index entry that indicates where output is located in an output buffer, and notifying the NIC 102 the location of the index for transmission.

GPUs achieve parallel processing benefits by utilizing a single instruction, multiple data (SIMD)/single instruction multiple threads (SIMT) model whereby a single instruction drives tens or hundreds of execution engines or arithmetic logic units (ALUs) in a group or warp. A warp is a single SIMD group of threads which execute in lockstep, e.g. 32 threads within the GPU 104. A set of threads will execute an instruction related to a kernel in lockstep. The GPU 104 executes conditional code blocks serially such that a total number of instructions is a sum of all executed conditionals.

The GPU 104 may include at least one processor having at least one processing core to achieve highly parallel processing. A processing core is a computing component having a CPU that reads and executes computer-readable instructions. Each processing core of a multi-core processor can execute different computer-readable instructions at the same time, thereby providing the processor the ability to execute computer-readable instructions in parallel. Each processing core includes its own cache (level 1) and share an additional cache (level 2). The processor cores are integrated into a single integrated circuit die or onto multiple integrated circuit dies. According to an example embodiment, the GPU 104 comprises thousands of processing cores each having a plurality of threads which are designed for parallel performance. The GPU 104 may be, for example, the INTEL® XEON PHI™, a field programmable gate array (FPGA), or a TILERA® multi-core processor. The GPU 104 is hardware having at least one processor to execute computer readable or computer executable instructions. The computer readable instructions may be stored in a non-transitory computer readable medium, such as memory, which also is hardware.

Before the NIC 102 stores data in buffers 109 in GPU memory and the GPU 104 processes the packets in the buffers 109, the NIC 102 and the GPU 104 are initialized by at least one CPU 106. When the CPU 106 initializes the GPU 104 and the NIC 102, e.g., at boot time, the CPU 106 assigns buffers, interrupts, and execution kernels. A CPU kernel maintains mapping between assigned buffers, GPUs, associated interrupts, and GPU kernels that execute on each interrupt. The GPU 104 will start an interrupt handler and can start kernels at boot time. In addition, the kernels can be dynamically initiated upon receipt of an interrupt in the GPU 104.

During initialization or at another time, the CPU 106 sends the user programmable state processing model comprising a filtering algorithm to the NIC 102 that is used by the NIC 102 to filter incoming packets into buffers and sends an associated script/program to the GPU 104. The associated script/program is executed by the GPU 104 to spawn execution kernels to process the buffers in GPU memory.

The CPU 106 may memory map storage into the GPU memory. This may be accomplished in manner similar to mapping network drives. For example, the CPU 106 requests a transfer of memory and deposits information into memory that is mapped into the GPU 104. The GPU 104 may have one thread that takes a request and finds required storage. If required storage is not currently available, the GPU 104 may indicate what is needed. In the event that the GPU memory is not made fully available to the NIC 102, the CPU 106 may also move the data directly to GPU memory using a swap. The CPU 106 may process an output vector and request a file for the GPU 104 at a required location. Once a block, e.g., a sequence of bytes or bits having a specified length, is loaded, the GPU thread may process the block a next time that the kernel is executed.

The CPU 106 may include a plurality of cores having a plurality of threads optimized for serial processing. The CPU 106 is hardware having at least one processor to execute computer readable or computer executable instructions. The computer readable instructions may be stored in a non-transitory computer readable medium, such as memory, which also is hardware.

The system 100 may be, for example, a Linux-based controller 103 having the X86_64 architecture or any other suitable operating system and computing architecture. Thus, according to an example embodiment, the controller 103 may provide functionality associated with a programmable logic controller as well as a traditional computer. The system 100 may include one or a plurality of NICs and/or GPUs which interface with one another using interconnects as well as to other components using a bus 113. The bus 113 may be a high speed bus and may be based on PCI Express (PCIe) 3.0 or any other appropriate standard. As is discussed above, the GPU 104 uses a physical memory model and exposes blocks of memory to the bus 113 such that the NIC 102 is configured to deliver data directly to the GPU 104.

In one embodiment, the bus 113 is driven by a switch/controller (not shown) within the CPU 106 such as a PLX ExpressLane™ switch. One or more CPU 106 in the system 100 with a switch serve as PCIe bridges. The switch creates autonomous PCIe "islands" of bandwidth. PCIe 2.0 is limited to 64 Gb of bandwidth and PCIe 3.0 is limited to 128 Gb of bandwidth, but this bandwidth can be expanded by having multiple PCIe "islands" that are connected. According to an example embodiment, the GPU 104 can be paired with the NIC 102 and/or storage 108 (described below) on a PCIe "island." Each CPU 106 in the system 100 can have its own "island" and be connected to at least one NIC 102, at least one GPU 104, and at least one optional storage 108 over the bus 113. Typically, interrupts and data would flow back to the CPU over the bus, causing CPU and I/O bottlenecks. However, once the CPU 106 in an "island" performs setup, the NIC 102, GPU 104, and storage 108 operate independently of the CPU 106. Thus, according to an example embodiment, a single CPU 106 is able to drive terabits of traffic.

The system may further include storage 108 such as volatile memory (RAM) and non-volatile storage. As an example, the non-volatile storage may include at least one solid state drive (SSD), optical storage, flash, and/or traditional electromechanical magnetic hard disks. The SSD or other storage 108 may be connected to the bus 113 using an NVM Express interface or other appropriate interfaces. Thus, using the bus 113, the GPU 104 may be in direct communication with the NIC 102 as well as the storage 108. As a result, the system 100 may maximize an SSD drive or other storage 108 which may be attached directly to the bus 113. The GPU 104 may utilize its large number of cores in order to fully saturate the bus 113 of the system 100 to store data within the storage 108, retrieve data from the storage 108, or use the storage 108 as virtual memory to swap data into and out of the storage 108.

As noted above, the least one NIC 102 is connected to a communications network 110 via a switch 112. The communications network 110 may be a wireless network and/or a wireline network, including a local area network (LAN), a wireless local area network (WLAN), a wide area network (WAN), a storage area network (SAN), etc. The communications network 110 is a packet-switched network capable of communicating data formed into packets. The system 100 may include a plurality of clients 114 and servers 116 connected as shown in FIG. 1A. The system 100 may be used to send and receive data to and from the clients 114 and servers 116 which are connected to the communications network 110.

The redundancy built into the system, e.g., more than one NIC 102 and more than one GPU 104, provides the system 100 with the ability to scale appropriately and match a data flow coming into/out of the system 100. If a GPU 104 or a bus 113 of the system 100 were to fail, the NIC 102 may be configured to utilize a backup destination and may send packets into buffers in a backup GPU location. An interrupt is transmitted to the backup GPU rather than the failed GPU in order to ensure that any message to process a buffer is sent to a correct GPU. Additionally, if there is a high load on the system 100, all available GPUs may be used in parallel, round robin, load balanced based on prior usage, or based on load/response times. Thus, the system 100 easily scales and adapts to changing conditions.

According to an example embodiment, the GPU 104 of the system may be located on a separate die from a CPU 106. According to another embodiment, the GPU 104 may be a co-processor of the CPU 106 and located on a same die as the CPU 106. As noted above, the CPU 106 and the GPU 104 may communicate over the bus 113 if the GPU 104 is discrete and an on-chip bus (not shown) if the CPU 104 and the GPU 106 are located on a same die. If the CPU 106 and the GPU 104 are located on a same die, this may eliminate traffic across the bus 113, but data would still typically be routed through the CPU 106. Instead, according to an example embodiment, the data need not be routed through the CPU 106, and is communicated directly from the NIC 102 to the GPU 104 at line speed over the bus 113.

FIG. 1B illustrates an additional block diagram of a system for accelerating network applications using an enhanced network interface and massively parallel distributed processing 100 which demonstrates how the bus 113 may be connected to nodes within the system 100. On the left side of FIG. 1B, a stream of incoming packets 202 are streaming into a NIC 102 which is connected to a CPU 106 and memory 108, such as dynamic random access memory (DRAM) as well as non-volatile memory. The NIC 102 is connected to at least one GPU 104 having a plurality of cores through a bus 113. As in the example of FIG. 1B, the bus 113 is a PCIe bus. The bus 113 provides an interface between the NIC 102, the GPU 104, and the operating system 118 and underlying application(s) 120. The bus 113 provides access to the operating system 118 (e.g., Linux) of the controller 103 as well as any applications 120 running on the controller 103. As initialized by the CPU 106, the NIC 102 has direct memory access to memory in the GPU 104 and direct memory access to memory related to the operating system and the application. According to an exemplary embodiment, and as shown in FIG. 1B, MSI-X interrupt processing is located directly within the GPU 104.

According to an example embodiment, the system 100 having at least one NIC 102, at least one GPU 104, and at least one CPU 106, solves the problems associated with the latency and inefficiencies of current methods and systems by providing accelerated packet processing on the GPU 104. The NIC 102 executes computer readable instructions which cause the NIC 102 to assign an index to each incoming packet and deposit received packets that match a specific ruleset or algorithm into a specific buffer 111 in memory of the GPU 104. Once a predetermined notification level is reached, the NIC 102 will signal via interrupt to the GPU 104 interrupt memory address 115 that the specific buffer 111 is full of packets and/or ready for processing by the GPU 104.

Rather than operating on data in the CPU 106, data may be moved directly from the NIC 102 to memory associated with the thousands of cores available in the GPU 104, bypassing the CPU 106. Thus, the GPU 104 may use threads in the thousands of cores to operate on thousands of packets simultaneously and utilize the large amount of available GPU memory.

Figure 2:
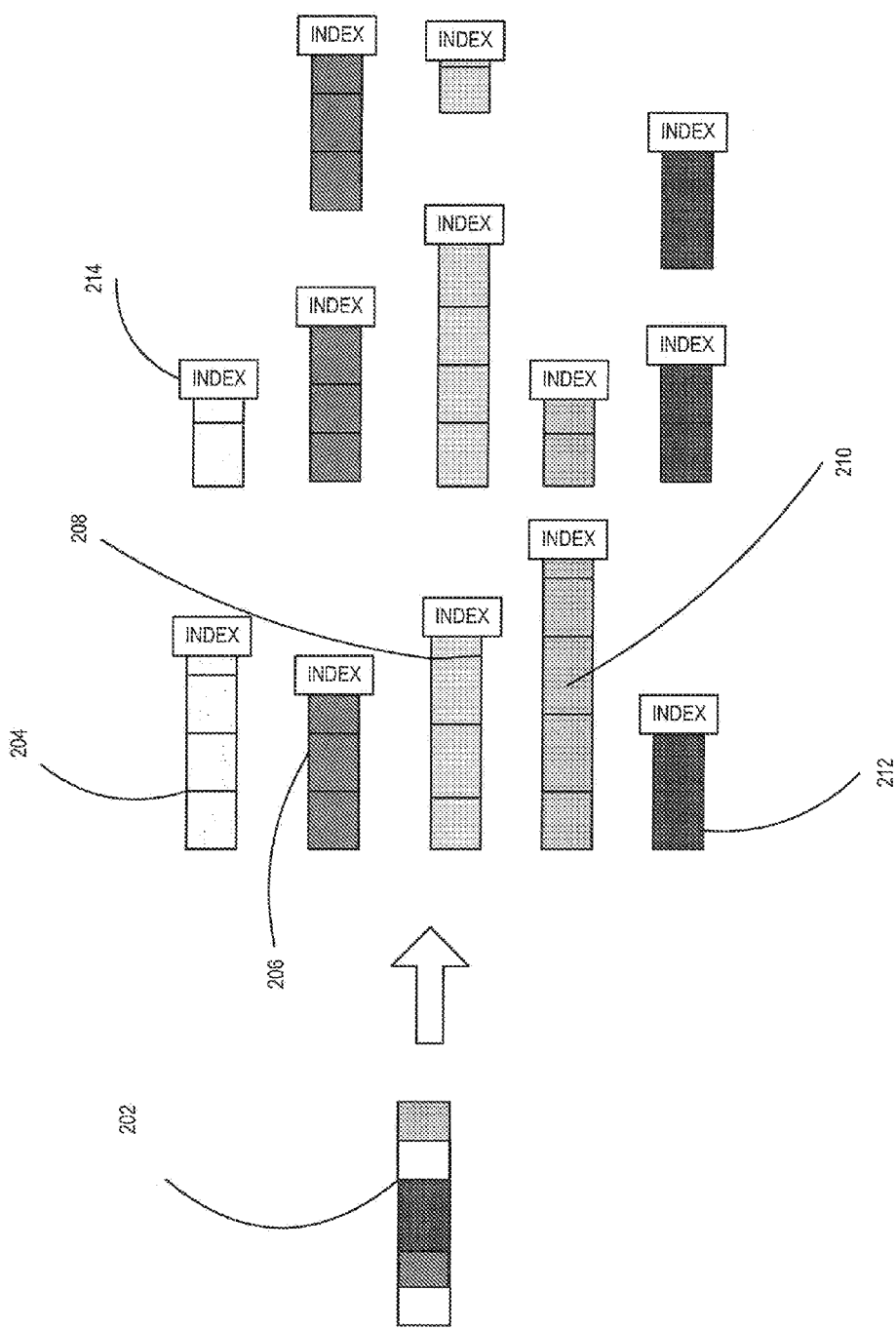
FIG. 2 illustrates a plurality of buffers storing packetized data according to an example embodiment.

Now referring to FIG. 2, an example of a plurality of buffers in memory of the GPU 104 is shown. A variety of incoming packets 202 are received by the NIC 102. The NIC 102 filters the incoming packets into groups of similar packets using the processing model derived from the associated algorithm. For protocols such as transmission control protocol (TCP), packets may be grouped by the NIC 102 by packet type, e.g., TCP FLAGS. RADIUS packets may be filtered by message type, e.g., AUTH, ACCT START, ACCT STOP, ACCT INTERIM, etc. Hypertext Transmission Protocol (HTTP) packets may be filtered by domain name, base uniform resource locator (URL), and/or HTTP command. Once a sufficient predefined number of packets are buffered by the NIC 102, e.g., the pre-configured criterion or notification level is determined to be reached by the NIC 102, the NIC 102 will notify the GPU 104 via memory interrupt, and the packets will be processed by a specialized kernel of the GPU 104 specific for the packet type. The CPU 106 as well as the operating system are bypassed and need not be involved with the network packets thereby eliminating any unnecessary traffic over the bus 113.

As an example, the NIC 102 processes and filters incoming packets into a buffer of TCP SYN packets 204, a buffer of TCP ACK packets 206, a buffer of HTTP GET packets 208, a buffer of NFS DATA packets 210, a buffer of RADIUS packets 212, etc. Each of these buffers may be stored in GPU memory by the NIC 102 using DMA. Each of the buffers may have a capped size or flow capacity and each buffer includes an index file 214 created by the NIC 102 that provides an offset of a start of each packet in GPU memory. An offset is, for example, a way of indicating a distance from the beginning of an object to another point in the object. For instance, memory can be viewed as a single array of integers 0-128. According to an example embodiment, a first packet may have index 1 that points to memory offset 56, where the memory begins at 0 and ends at 128. Thus, the first packet is located at memory offset 56. A second packet may have an index 2 that points to memory offset 70, where the memory begins at 0 and ends at 128. Thus, the second packet is located at memory offset 70. The index file 214 will list each index in the buffer and an offset in GPU memory that each index points to. The index file 214 may also include a length of each packet. The index file 214 may or may not include a total packet count created by the NIC 102. If there is a total count, then the GPU 104 will dispatch a number of threads based on the total packet count for the buffer. If there is not a total packet count, then the index should allow for a minimum number of entries, and unused entries are to be flagged, e.g, zeroed.

For example, as shown in FIG. 2, a first group of TCP SYN packets includes two buffers each having an index file 214 indicating where each packet is located in GPU memory, a second group of TCP ACK packets includes two buffers each having an index file 214 indicating where each packet is located in GPU memory, a third group of HTTP GET packets includes three buffers each having an index file 214 indicating where each packet is located in GPU memory, a fourth group of NFS DATA packets includes two buffers each having an index file 214 indicating where each packet is located in GPU memory, and a fifth group of RADIUS packets includes three buffers each having an index file 214 indicating where each packet is located in GPU memory. The buffer size or flow capacity in each subset may be based on a predetermined notification level as described above.

As another example, for a TCP application, each state in the TCP protocol may have a separate buffer or subset of buffers within the NIC 102. The NIC 102 may segment traffic by analyzing the TCP FLAGS field in a header of each packet and may also use other conditionals such as ACK with or without PSH flag in order to place an incoming packet into an appropriate buffer within the NIC 102.

The NIC 102 may also compress/tokenize a payload to further reduce stress on a system. The NIC 102 receives packets, evaluates a set of state model defined rules, and executes predefined operations including drop packet, substitute, etc. This processing of the payload may be accomplished, for example, using a fixed/shared codebook, run-length compression, gzw compression, or dynamic compression. The NIC 102 may receive codebook algorithms from the CPU 106, and the GPU 104 may provide reverse processing to decompress or detokenize the payload. As an example, when processing millions of simultaneous web clients for a telecommunications provider, device headers which comprise a number of bits to indicate where data is stored on a network may be identical for a large number of clients. The device headers and their tokenized representations may be stored in shared high speed high context memory of the GPU 104. Thus, related traffic associated with processing a payload associated with the millions of web clients need not be sent over the bus 113 of the system 100 providing increased bus capacity.

Figure 3:
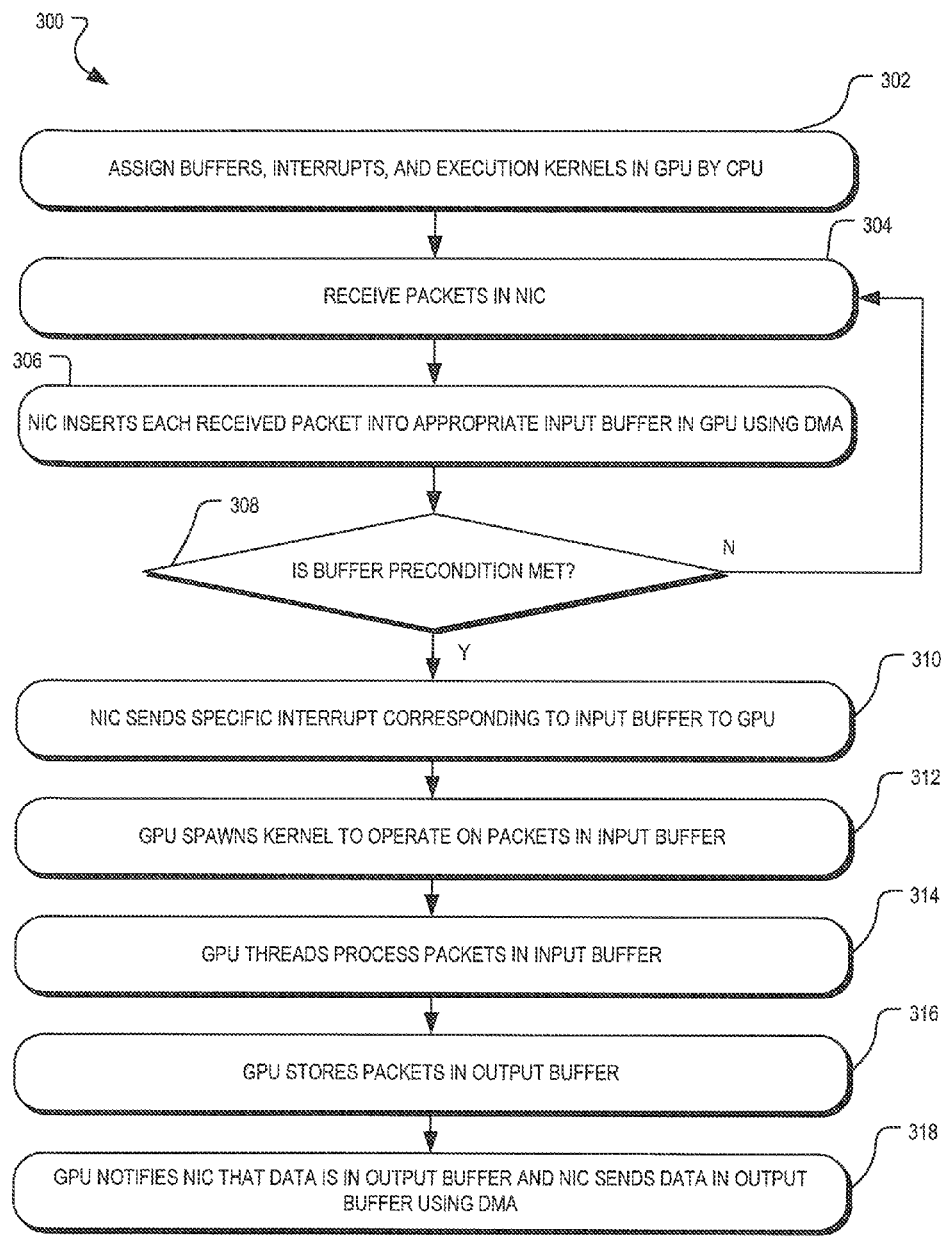
FIG. 3 illustrates a flowchart of a process of routing and processing data in a system for accelerating network applications using an enhanced network interface and massively parallel distributed processing according to an example embodiment.

FIG. 3 illustrates a flowchart of a process 300 for routing data in a system for accelerating network applications using an enhanced network interface and massively parallel distributed processing 100 according to an example embodiment. The process 300 shown in FIG. 3 begins in step 302. In step 302, buffers, interrupts, and execution kernels may be assigned in the GPU 104 by the CPU 106. According to an example embodiment, when the CPU 106 initializes the GPU 104 and the NIC 102, the CPU 106 assigns buffers, interrupts, and execution kernels. A CPU kernel maintains mapping between assigned buffers, GPUs, associated interrupts, and programs that execute on each interrupt.

Next, in step 304, packets are received in the NIC 102 from a source, such as a network 110. As the packets are being received by the NIC 102, in step 306, the NIC 102 inserts each received packet into an appropriate input buffer of a subset or group of buffers in memory in the GPU 104 using DMA based on the processing model. The processing model used by the NIC 102 may be derived from the associated algorithm. Each packet is assigned an index by the NIC 102 that points to an offset indicating the packet's location in GPU memory. For instance, memory can be viewed as a single array of integers 0-128. A packet may be located at offset 56 within memory. An index, e.g., index 1 could point to memory offset 56, where the memory begins at 0 and ends at 128. An index 2 could point to memory offset 70, where the memory begins at 0 and ends at 128. In step 308, the NIC 102 determines whether a buffer criterion or notification level is met. As an option, a status flag may be set by the NIC 102 that indicates that the criterion or notification level is met. If the buffer criterion or notification level is determined to not be met by the NIC 102, then packets will continue to be received by the NIC 102 and inserted by the NIC 102 into appropriate input buffers and assigned indexes. However, if the buffer criterion or notification level is determined to be met by the NIC 102 in step 308, then in step 310 the NIC 102 sends a specific interrupt corresponding to an input buffer directly to the GPU 104, e.g., the corresponding memory interrupt memory address at the GPU 104 for the interrupt or data associated with or corresponding to the interrupt or processing to be performed by the GPU 104.

In step 312, the GPU 104 will spawn a kernel to process packets in the input buffer and identical computer-executable instructions will be executed by one or a plurality of threads (e.g., a warp) on the packets in the buffer. The NIC 102 sends commands to the GPU 104 to invoke a kernel on one or more buffers instead of a host driver sending the commands. This may reduce latency involved with invoking a kernel, and is accomplished by having the NIC 102 generate bus commands that mimic those of the host driver. Alternately, the GPU 104 can poll the interrupt memory addresses and invoke a kernel assigned to a particular memory address or invoke one or more kernels each assigned to one or more interrupt memory addresses.

In step 314, by using an index file 214, the GPU threads will execute kernel code to process the packets in the one or more input buffers by parallel processing in lockstep. The index file 214 indicates where each packet is located in memory of the GPU 104, and the GPU threads use the index file 214 to complete processing of all packets in a buffer(s). If there is an output, then in step 316, the GPU 104 will store output packets or data in output buffer(s) and set an index for the data in the output buffer(s). If an output packet is not created, then the GPU 104 may create an index entry that indicates that no output packet was created. The GPU 104 can optionally set an output flag indicating that the output buffer(s) is ready that will be used to notify a kernel. In step 318, a kernel may be spawned by the GPU 104 to notify the NIC 102 that there is data in the output buffer(s) of the GPU 104 that is ready to transmit by sending the NIC 102 the index for the data in the output buffer. The NIC 102 will send the data stored in the output buffer in the GPU 104 using DMA.

Massively Parallel Distributed Networking

Figure 4A:
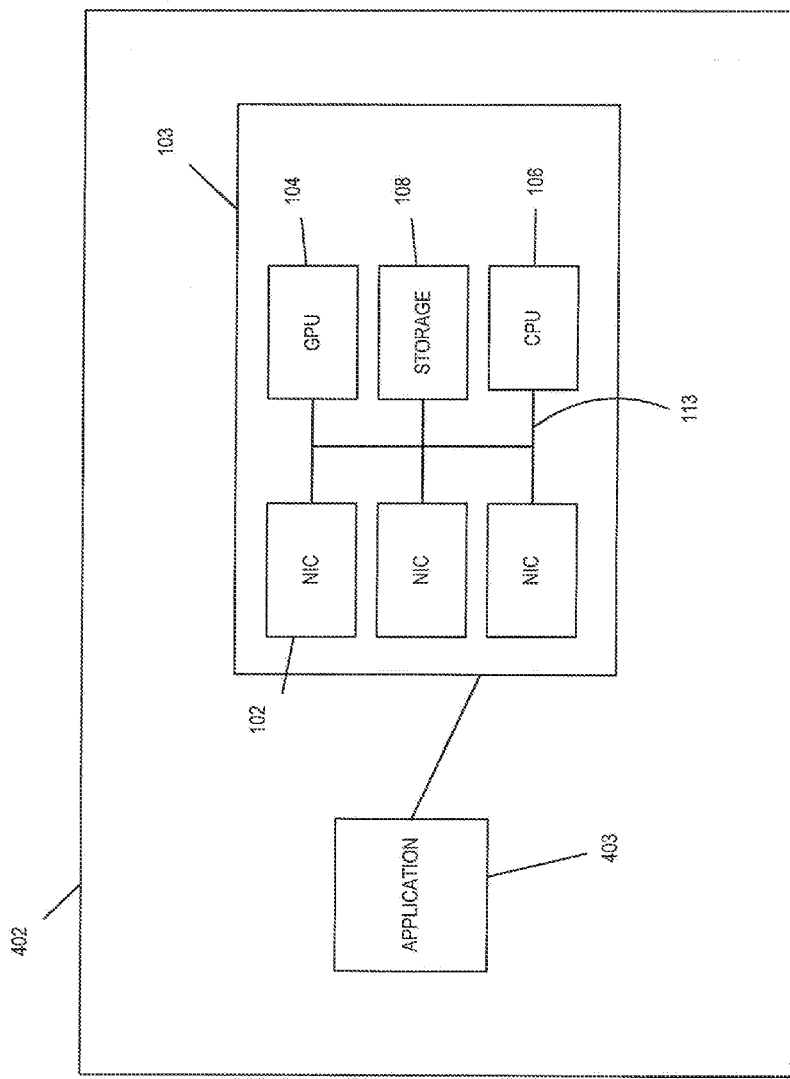
FIG. 4A illustrates a web server acting as a system for accelerating network applications using an enhanced network interface and massively parallel distributed processing according to an example embodiment.

According to an example embodiment, the system 100 may be incorporated into a web server 402 that provides parallel protocol processing as shown in FIG. 4A. The web server 402 executes at least one application 403 that can be used to handle a very large number of socket connections. The web server 402 comprises one or more NIC(s) 102, one or more GPU(s) 104, one or more CPU(s) 106, and optional storage 108 as described herein. The NIC(s) 102, the GPU(s) 104, and the storage 108 are connected via a bus 113. Each of the components of the system 100 that comprise the web server 402 is part of a controller 103 as described herein.

For example, a server 402 can include 4×16 PCIe slots behind a PLX ExpressLane™ switch, and one or two PCIe trunks connected upstream to another PLX ExpressLane™ switch, creating an inverted tree of nodes having one or more CPU(s) 106 to provide configuration and minimal data input/output. According to an exemplary embodiment, the 4×16 PCIe slots can achieve their theoretical bandwidths and be connected to at least one NIC 102, at least one GPU 104, and at least one storage 108.

The web server 402 is hardware having at least one GPU 104 and CPU 106 (each with at least one processor) to execute computer readable or computer executable instructions. The computer readable instructions may be stored in a non-transitory computer readable medium, such as memory 108 which also is hardware.

Figure 4B:
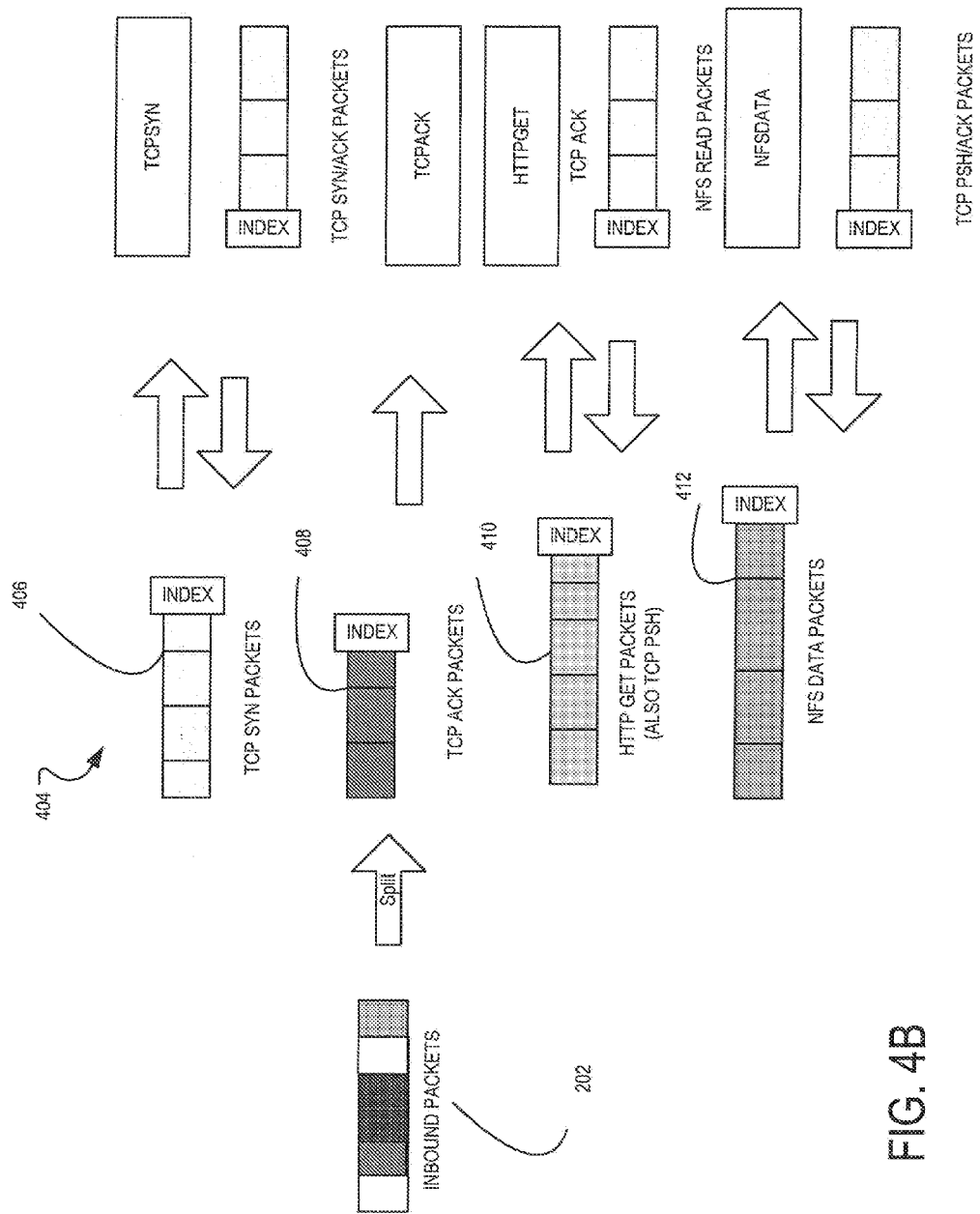
FIG. 4B illustrates a web server acting as a system for accelerating network applications using an enhanced network interface and massively parallel distributed processing receiving a stream of incoming packets and filtering the packets into buffers according to an example embodiment.

As shown in FIG. 4B, as the inbound packets are received by one or more NICs 102 in the web server, they may be divided by the NICs 102 into a plurality of streams based on an amount of incoming traffic, and the streams are split or divided into a number of buffers based on a type of packet 404. FIG. 4B shows a buffer of TCP SYN packets 406, a buffer of TCP ACK packets 408, a buffer of HTTP GET packets 410 and a buffer of NFS DATA packets 412. Using the index file 214 for each of the buffers, the GPU 104 in the web server may be used to simultaneously process the packets in each of these buffers by executing associated kernels. According to an example embodiment, index 1 could point to memory offset 56, where the memory begins at 0 and ends at 128. A first packet could be located at offset 56. An index 2 could point to memory offset 70, where the memory begins at 0 and ends at 128. A second packet could be located at offset 70. Each thread simultaneously processes packets by referencing an index of the packet and locating the packet in GPU memory using the offset associated with the index of the packet.

The NIC 102 of the system 100 in the web server 402 may maintain an NFS client connection for each hardware thread. When the web server 402 receives an HTTP request for a file over a TCP connection, the web server 402 may generate a Network File System (NFS) request payload. This payload may be passed to the NIC 102, and the NIC 102 may insert active NFS connection information into the HTTP request. When NFS response data is returned from a server, the NIC 102 may place the NFS response data into a buffer in GPU memory that is used for NFS content replies. The GPU 104 may generate an appropriate TCP reply, e.g., SEQ/ACK numbers, and return a packet to the NIC 102 as shown in FIG. 4B. The NIC 102 may also be configured to generate HTTP/TCP reply packets if the NIC 102 is used to store required stream parameters.

According to a further example embodiment, the system 100 may run stateless. In other words, if content is required for a HTTP/TCP stream, the web server 402 may generate an NFS request having a size of one packet. The web server 402 may also request a large enough buffer, generate N packets based on the buffer, and transmit the N packets. The web server 402 may select a properly sized NFS request in order to fit within a TCP window. Instead of waiting for a client to notify the web server 402 that the window has expanded, the web server 402 may send a number of additional packets based on observed previous behavior.

The system 100 described herein may be used to improve a variety of network based applications and systems. As an example, there are currently billions of mobile devices in operation throughout the world, and there is an ongoing need to service authentication and reporting of authentication requests. Authentication is commonly achieved using RADIUS authentication. RADIUS authentication packets may be received by the NIC 102 and pushed to the GPU 104. The thousands of threads of the GPU 104 may be used to verify the authenticity of the authentication requests by performing MD5 (message digest) authentication on the data. MD5 (Message-Digest algorithm 5) is a cryptographic hash function that produces a 128-bit hash value when applied to data. An MD5 value, e.g. checksum, is typically a hexadecimal number. MD5 is commonly used to verify the integrity of files which are transmitted over a network. As an example, when a file is sent over a network, the file's MD5 value is also sent so that the integrity of the file can be determined upon receipt. As the packets are being processed by the GPU 104, the results of the MD5 authentication may be stored as a vector in an output buffer in the GPU 104 and fed to a response generator kernel to process the requests in parallel. A packet generator kernel may be used to create output packets. An MD5 checksum of output packets is generated. Other checksums can be partially or completely generated on the GPU 104 and transported back to the NIC 102 using DMA. The NIC 102 can complete a checksum with any fields that the NIC 102 inserts or modifies.

As another example, the NIC 102 and the GPU 104 may be utilized for secure socket layer (SSL) processing, e.g., a protocol for encrypting information sent over a network. Each block of SSL data, regardless of source, will require identical processing, and each block of SSL data has separate encryption parameters. The NIC 102 and the GPU 104 may also be used for other applications, such as stream control transmission protocol (SCTP) processing, short message service (SMS) message processing, session initiation protocol (SIP) messaging, processing of lightweight directory access protocol (LDAP) requests, processing of Diameter requests, packet sniffing/packet analysis, processing of network file system (NFS) requests, SYSLOG event logging, call detail record (CDR) generation, etc.

The GPU 104 may be used to generate parallel response packets to incoming packets as well as to generate other network packets. These other network packets may include SYSLOG updates, call detail records (CDR) related to telecommunications data, as well as text logs for packet processing.

As another example, conventionally, when data is transported from a server to a client using a communications network, such as video data for a large video provider, the data is requested by the server from storage. Many data providers have to handle millions of simultaneous connections. Data intensive applications may include web servers, telecommunication applications, data capture applications, data analysis applications, and Hadoop applications. The data providers may place requests into queues and may require a large number of steps to move data from a storage to the server and to the client. These queues reduce the data providers' ability to efficiently process requests.

As another example, the system 100 may access disk information for a client's file request in a plurality of ways. As a first approach, the GPU 104 may pass filenames to the CPU 106 and have the CPU 106 send requests. The CPU 106 may receive responses and submit the responses to the GPU 104. The NIC 102 may maintain an NFS connection, and the GPU 104 may fabricate or mimic a packet or template to the NIC 102 using DMA. Response packets may be filtered by the NIC 102, assigned to buffers in GPU memory, and processed. The GPU 104 may be used to store storage block requests directly into memory of a storage processor card using DMA. The storage processor card may then insert results of I/O operations back to GPU memory.

As an example, the client may be requesting video data such as a movie to be streamed from network attached storage (NAS) through a server. The client may send an HTTP GET request to the server. The HTTP GET will be received in a NIC by the server. The server may perform initial processing such as determining whether the movie is available to be viewed as well as determining whether the client is allowed to view the movie. In addition, the server may return session attribute information regarding client session information, including an IP address the request came from, a port address that the request came from, etc. by using TCP request information. Conventionally, the server's CPU was taxed by having to process a high number of simultaneous requests. However, according to example embodiments, the bottleneck related to the server's CPU may be avoided by incorporating the system 100 into a web server 402.

Rather than having the server obtain the requested data for the movie from the storage and operating on the data to return the data to the client, the NIC 102 may be used to return the data directly to the client from a storage 108 attached to a bus 113. This allows the NIC 102 to work at line speed by wrapping the data with a header and a footer and sending the data to the client. The NIC 102 may retrieve data payloads from a network attached storage that fit within a maximum transmission unit (MTU). Thus, according to an example embodiment, caching of data by the server is not required. In other words, the NIC 102 is a high-speed packet switcher, and the server need only be minimally involved in the transportation of the data to the client. The NIC 102 essentially acts as a media server to provide the data that fits within a maximum transmission unit (MTU) to a recipient.

As an additional embodiment, data may be uploaded from a client to a system 100 connected to a server. Rather than having a CPU 106 in the system 100 determine where to store uploaded data, such as photos or video, a NIC 102 may bypass the server and store the data directly into storage 108 attached to a bus 113. The NIC 102 may maintain connections and send NFS queries to store the data remotely.

According to an additional embodiment, the NIC 102 in a web server 402 may choose to direct data traffic to a specific set of processor cores based upon fluctuation of data traffic, failure of nodes, etc. The processor cores may be shared by the system 100 and may be located within the CPU 106 and/or the GPU 104. As an example, if there is a low amount of traffic being received by the NIC 102, the NIC 102 may determine to route the traffic directly to the CPU 106 and not utilize processor cores within the GPU 104. In other words, the CPU 106 itself may be used for interrupt processing. However, the NIC 102 may determine that at a predetermined level of ticks per second to reroute traffic from the CPU 106 to the GPU 104 or share the load between the GPU 104 and the CPU 106, e.g., execute interrupt processing on both the CPU 106 and the GPU 104.

In other words, as a load increases on the system 100, the NIC 102 may choose to reroute traffic from cores in the CPU 106 to cores in the GPU 104. The NIC 102 also may choose to select to route traffic from an overutilized GPU to a GPU which is being underutilized, or direct traffic from one GPU to another GPU in the event of a failure. According to an embodiment, the system 100 may provide a web application including ten servers each having four NICs and four GPUs. If all NICs in the system share hashing and distribution of incoming traffic, then a client sending traffic to the web application can send the request to any NIC on any server and the NICs are able to reroute traffic to any available processor cores in the system 100 based on a current load.

Figure 5:
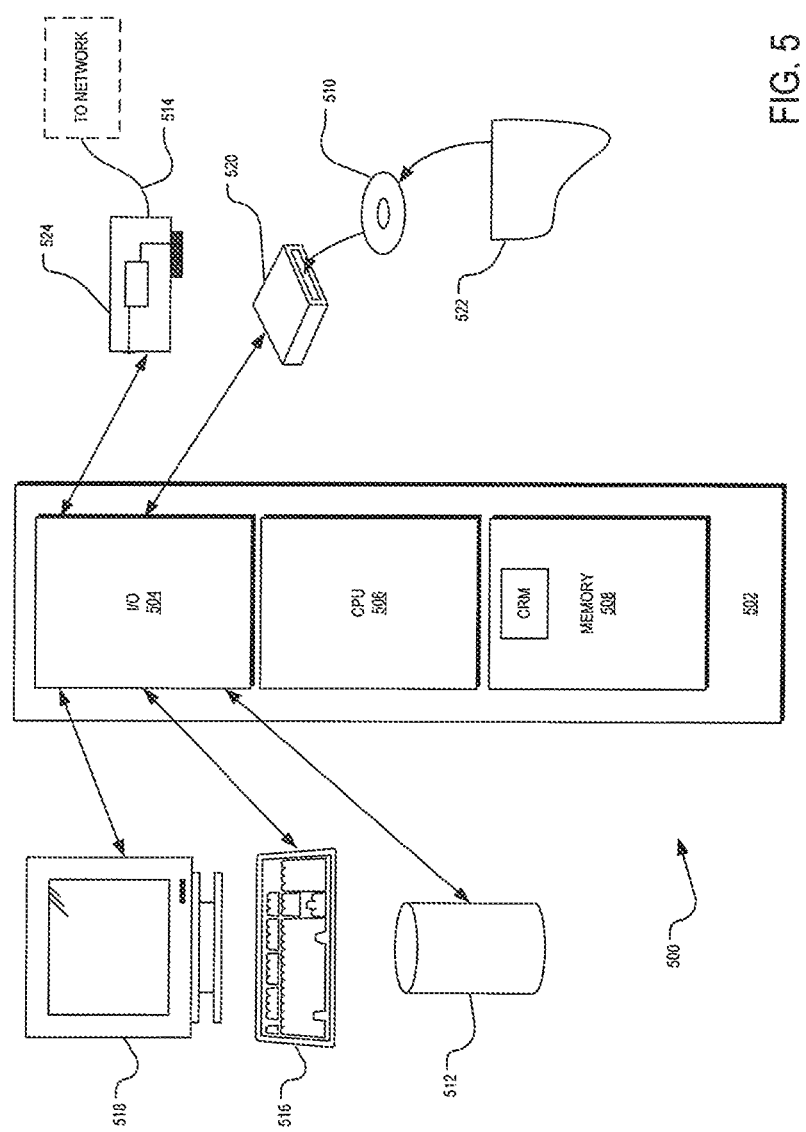
FIG. 5 is a block diagram illustrating an example computing device for use with the example embodiments.

FIG. 5 illustrates an example computing system 500 that may implement various systems and methods discussed herein, such as the server 402. A general purpose computer system 500 is capable of executing a computer program product to execute a computer process. Data and program files may be input to the computer system 500, which reads the files and executes the programs therein. Some of the elements of a general purpose computer system 500 are shown in FIG. 5 wherein a processor 502 is shown having an input/output (I/O) section 504, a central processing unit (CPU) 506, and a memory section 508. There may be one or more processors 502, such that the processor 502 of the computer system 500 comprises a single central-processing unit 506, or a plurality of processing units, commonly referred to as a parallel processing environment. The computer system 500 may be a conventional computer, a server 402, a distributed computer, or any other type of computer, such as one or more external computers made available via a cloud computing architecture. The presently described technology is optionally implemented in software devices loaded in memory 508, stored on a configured DVD/CD-ROM 510 or storage unit 512, and/or communicated via a wired or wireless network link 614, thereby transforming the computer system 500 in FIG. 5 to a special purpose machine for implementing the described operations.

The memory section 508 may be volatile media, nonvolatile media, removable media, non-removable media, and/or other media or mediums that can be accessed by a general purpose or special purpose computing device. For example, the memory section 508 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 504 is connected to one or more user-interface devices (e.g., a keyboard 516 and a display unit 518), a disc storage unit 512, and a disc drive unit 520. Generally, the disc drive unit 520 is a DVD/CD-ROM drive unit capable of reading the DVD/CD-ROM medium 510, which typically contains programs and data 522. Computer program products containing mechanisms to effectuate the systems and methods in accordance with the presently described technology may reside in the memory section 504, on a disc storage unit 512, on the DVD/CD-ROM medium 510 of the computer system 500, or on external storage devices made available via a cloud computing architecture with such computer program products, including one or more database management products, web server products, application server products, and/or other additional software components. Alternatively, a disc drive unit 520 may be replaced or supplemented by a floppy drive unit, a tape drive unit, or other storage medium drive unit. The network adapter 524 is capable of connecting the computer system 500 to a network via the network link 514, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 500 is connected (by wired connection or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are examples of communications devices for and other means of establishing a communications link between the computers may be used.

In an example implementation, the source code executed by the GPU 104 and the NIC 102, a plurality of internal and external databases, source databases, and/or cached data on servers are stored in memory of the GPU 104, the memory 508 or other storage systems, such as the disk storage unit 512 or the DVD/CD-ROM medium 510, and/or other external storage devices made available and accessible via a network architecture. The source code executed by the GPU 04 and the NIC 102 may be embodied by instructions stored on such storage systems and executed by the processor 502.

Some or all of the operations described herein may be performed by the processor 502. Further, local computing systems, remote data sources and/or services, and other associated logic represent firmware, hardware, and/or software configured to control operations of the system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 502 and a user may interact with a Graphical User Interface (GUI) using one or more user-interface devices (e.g., the keyboard 516, the display unit 518, and the user devices 504) with some of the data in use directly coming from online sources and data stores. The system set forth in FIG. 6 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system, comprising:
   at least one network interface comprising at least one first processor to:
      receive a plurality of packets from a network;
      for each packet in the plurality of packets, analyze packet contents to determine a specific data type to which the respective packet corresponds;
      filter the plurality of packets into a plurality of groups, each group based on the specific data type;
      insert the plurality of packets of a first group into a corresponding first buffer in memory of at least one graphics processing unit using direct memory access;
      assign each of the packets of the first group an index representing an offset indicating a location in the memory of the at least one graphics processing unit;
      determine that a pre-configured buffer flow capacity has been reached regarding the first buffer in the at least one graphics processing unit; and
      transmit an interrupt to the at least one graphics processing unit corresponding to the pre-configured buffer flow capacity regarding the first buffer in the least one graphics processing unit; and
   the at least one graphics processing unit connected to the at least one network interface over a bus and comprising at least one second processor to:
      start a first kernel preconfigured with packet handling code adapted to process packets of the specific data type in response to the interrupt to process the packets in the first buffer;
      wherein a substantially identical set of computer-readable instructions associated with the first kernel is executed on each of the packets in the first buffer;
      wherein a plurality of threads are executed on the at least one graphics processing units to process the packets in the first buffer at the index location assigned to each corresponding packet;
      wherein upon a failure of one or more graphics processing units, send packets to backup GPU buffers and transmit an interrupt to one or more backup graphics processing units.

2. The system of claim 1, wherein the at least one network interface comprising the at least one first processor determines that a second pre-configured buffer flow capacity has been reached regarding a second buffer in the at least one graphics processing unit, and transmits a second interrupt to the at least one graphics processing unit corresponding to the second pre-configured buffer flow capacity regarding the second buffer in the least one graphics processing unit; and
   the at least one graphics processing unit comprising the at least one second processor starts a second kernel preconfigured with packet handling code adapted to process packets of the specific data type in the at least one graphics processing unit in response to the second interrupt to process second packets in the second buffer.

3. The system of claim 1, further comprising a central processing unit comprising at least one third processor to map each buffer in the memory of the at least one graphics processing unit to at least one interrupt.

4. The system of claim 1, wherein the at least one graphics processing unit locates each packet in the first buffer in the memory of the at least one graphics processing unit using the index and executes the first kernel to process each packet in the first buffer by at least one thread simultaneously executing first kernel code in lockstep.

5. The system of claim 1, wherein the at least one graphics processing unit generates output packets into an output buffer in the memory of the at least one graphics processing unit.

6. The system of claim 5, further comprising a storage device connected to the bus to store the output packets using a non-volatile memory host controller interface.

7. The system of claim 5, wherein the at least one graphics processing unit notifies the at least one network interface that the output packets in the output buffer in the memory of the at least one graphics processing unit are ready to transmit.

8. The system of claim 1, wherein the first group of packets is associated with at least one member of a group consisting of RADIUS authentication, Diameter processing, SSL processing, TCP/HTTP requests, SMS messaging, and SIP messaging.

9. The system of claim 1, wherein the pre-configured buffer flow capacity regarding the first buffer in the least one graphics processing unit corresponds to at least one member of a group consisting of percentage of buffer memory used in the first buffer, buffer memory remaining in the first buffer, a number of packets currently in the first buffer, an elapsed time since a first packet was received in the first buffer, and an elapsed time since a last packet was received in the first buffer.

10. The system of claim 1, wherein the bus comprises a Peripheral Component Interface Express bus.

11. The system of claim 1, wherein the at least one network interface assigns a classification to each of the packets and inserts each of the packets into the first buffer in the memory of the at least one graphics processing unit responsive to the classification using direct memory access.

12. A system, comprising:
at least one network interface comprising at least one first processor to:
receive a stream of packets from a network;
split the stream of packets into at least one packet stream subset;
for each packet in the stream of packets, analyze packet contents to determine a specific data type to which the respective packet corresponds;
filter the stream of packets into a plurality of groups, each group based on the specific data type;
insert each packet of a first group into a corresponding first buffer in memory of at least one graphics processing unit using direct memory access;
assign each of the packets of the first group an index representing an offset indicating a location in the memory of the at least one graphics processing unit;
determine that a pre-configured buffer flow capacity has been reached regarding the first buffer in the at least one graphics processing unit; and
transmit an interrupt to the at least one graphics processing unit corresponding to the pre-configured buffer flow capacity regarding the first buffer in the least one graphics processing unit; and
the at least one graphics processing unit connected to the at least one network interface over a bus and comprising at least one second processor to:
start a first kernel preconfigured with packet handling code adapted to process packets of the specific data type in response to the interrupt to process the packets in the first buffer;
wherein a substantially identical set of computer-readable instructions associated with the first kernel is executed on each of the packets in the first buffer;
wherein a plurality of threads are executed on the at least one graphics processing units to process the packets in the first buffer at the index location assigned to each corresponding packet;
wherein upon a failure of one or more graphics processing units, send packets to backup GPU buffers and transmit an interrupt to one or more backup graphics processing units.

13. The system of claim 12, wherein the at least one network interface assigns a classification to each packet in each packet stream subset and inserts each packet in each packet stream subset into the first buffer in memory of the at least one graphics processing unit responsive to the classification using direct memory access.

14. A server, comprising:
at least one network interface comprising at least one first processor to:
receive a plurality of packets from a network;
for each packet in the plurality of packets, analyze packet contents to determine a specific data type to which the respective packet corresponds;
filter the plurality of packets into a plurality of groups, each group based on the specific data type;
insert the plurality of packets of a first group into a corresponding first buffer in memory of at least one graphics processing unit using direct memory access;
assign each of the packets of the first group an index representing an offset indicating a location in the memory of the at least one graphics processing unit;
determine that a pre-configured buffer flow capacity has been reached regarding the first buffer in the at least one graphics processing unit; and
transmit an interrupt to the at least one graphics processing unit corresponding to the pre-configured buffer flow capacity regarding the first buffer in the least one graphics processing unit; and
the at least one graphics processing unit connected to the at least one network interface over a bus and comprising at least one second processor to:
start a first kernel preconfigured with packet handling code adapted to process packets of the specific data type in response to the interrupt to process the packets in the first buffer;
wherein a substantially identical set of computer-readable instructions associated with the first kernel is executed on each of the packets in the first buffer;
wherein a plurality of threads are executed on the at least one graphics processing units to process the packets in the first buffer at the index location assigned to each corresponding packet;
wherein upon a failure of one or more graphics processing units, send packets to backup GPU buffers and transmit an interrupt to one or more backup graphics processing units.

15. The server of claim 14, wherein the at least one network interface assigns a classification to each of the plurality of packets and inserts each of the packets into a second buffer in the memory of the at least one graphics processing unit responsive to the classification using direct memory access.

16. A method, comprising:
receiving, by at least one network interface comprising at least one first processor, a plurality of packets from a network;
analyzing, by the at least one network interface comprising at least one first processor, packet contents of each packet in the plurality of packets to determine a specific data type to which the respective packet corresponds;
filtering, by the at least one network interface comprising at least one first processor, the plurality of packets into a plurality of groups, each group based on the specific data type;
inserting, by the at least one network interface comprising the at least one first processor, each of the plurality of packets of a first group into a corresponding first buffer in memory of at least one graphics processing unit using direct memory access;
assigning, by the at least one network interface comprising the at least one first processor, each of the packets of the first group an index representing an offset indicating a location in the memory of the at least one graphics processing unit;

determining, by the at least one network interface comprising the at least one first processor, that a pre-configured buffer flow capacity has been reached regarding the first buffer in the at least one graphics processing unit;

transmitting, by the at least one network interface comprising the at least one first processor, an interrupt to the at least one graphics processing unit corresponding to the pre-configured buffer flow capacity regarding the first buffer in the at least one graphics processing unit; and starting, by the at least one graphics processing unit comprising at least one second processor, a first kernel preconfigured with packet handling code adapted to process packets of the specific data type in response to the interrupt to process the packets in the first buffer;

wherein a substantially identical set of computer-readable instructions associated with the first kernel is executed on each of the packets in the first buffer;

wherein a plurality of threads are executed on the at least one graphics processing units to process the packets in the first buffer at the index location assigned to each corresponding packet;

wherein upon a failure of one or more graphics processing units, send packets to backup GPU buffers and transmit an interrupt to one or more backup graphics processing units.

17. The method of claim 16, wherein the at least one graphics processing unit is connected to the at least one network interface over a bus.

18. The method of claim 17, further comprising:
generating, by the at least one graphics processing unit, output packets into an output buffer in the memory of the at least one graphics processing unit.

19. The method of claim 18, further comprising:
storing the output packets in a storage device connected to the bus using a non-volatile memory host controller interface.

20. The method of claim 18, further comprising:
notifying, by the at least one graphics processing unit, the at least one network interface that the output packets in the output buffer in the memory of the at least one graphics processing unit are ready to transmit.

21. The method of claim 17, wherein the bus comprises a Peripheral Component Interface Express bus.

22. The method of claim 16, further comprising:
inserting, by the at least one network interface comprising the at least one first processor, each of the plurality of packets of a first group into a corresponding second buffer in memory of at least one graphics processing unit using direct memory access;

assigning, by the at least one network interface comprising the at least one first processor, each of the packets of the second group an index representing an offset indicating a location in the memory of the at least one graphics processing unit;

determining, by the at least one network interface comprising the at least one first processor, that a pre-configured second buffer flow capacity has been reached regarding the second buffer in the at least one graphics processing unit, and transmitting a second interrupt to the at least one graphics processing unit corresponding to the second pre-configured buffer flow capacity regarding the second buffer in the least one graphics processing unit; and starting, by the at least one graphics processing unit comprising the at least one second processor, a second kernel preconfigured with packet handling code adapted to process packets of the specific data type in the at least one graphics processing unit in response to the second interrupt to process second packets in the second buffer.

23. The method of claim 16, further comprising:
mapping, by a central processing unit comprising at least one third processor, each buffer in the memory of the at least one graphics processing unit to at least one interrupt.

24. The method of claim 16, further comprising:
locating, by the at least one graphics processing unit, each packet in the first buffer in the memory of the at least one graphics processing unit using the index and executing the first kernel to process each packet in the first buffer by at least one thread simultaneously executing first kernel code in lockstep.

25. The method of claim 16, wherein the first group of packets is associated with at least one member of a group consisting of RADIUS authentication, Diameter processing, SSL processing, TCP/HTTP requests, SMS messaging, and SIP messaging.

26. The method of claim 16, wherein the pre-configured buffer flow capacity regarding the first buffer in the least one graphics processing unit corresponds to at least one member of a group consisting of one of percentage of buffer memory used in the first buffer, buffer memory remaining in the first buffer, a number of packets currently in the first buffer, an elapsed time since a first packet was received in the first buffer, and an elapsed time since a last packet was received in the first buffer.

27. The method of claim 16, further comprising:
assigning, by the at least one network interface, a classification to each of the packets and inserting each of the packets into the first buffer in the memory of the at least one graphics processing unit responsive to the classification using direct memory access.

28. A method, comprising:
receiving, by at least one network interface comprising at least one first processor, a stream of packets from a network;

splitting, by the at least one network interface comprising the at least one first processor, the stream of packets into at least one packet stream subset;

analyzing, by the at least one network interface comprising at least one first processor, packet contents of each packet in the at least one packet stream subset to determine a specific data type to which the respective packet corresponds;

filtering, by the at least one network interface comprising at least one first processor, the at least one packet stream subset into a plurality of groups, each group based on the specific data type;

inserting, by the at least one network interface comprising the at least one first processor, each packet of a first group into a corresponding first buffer in memory of at least one graphics processing unit using direct memory access;

assigning, by the at least one network interface comprising the at least one first processor, each of the packets of the first group an index representing an offset indicating a location in the memory of the at least one graphics processing unit;

determining, by the at least one network interface comprising the at least one first processor, that a pre-configured buffer flow capacity has been reached regarding the first buffer in the at least one graphics processing unit;

transmitting, by the at least one network interface comprising the at least one first processor, an interrupt to the at least one graphics processing unit corresponding to the pre-configured buffer flow capacity regarding the first buffer in the at least one graphics processing unit; and starting, by the at least one graphics processing unit comprising at least one second processor, a first kernel preconfigured with packet handling code adapted to process packets of the specific data type in response to the interrupt to process the packets in the first buffer;

wherein a substantially identical set of computer-readable instructions associated with the first kernel is executed on each of the packets in the first buffer;

wherein a plurality of threads are executed on the at least one graphics processing units to process the packets in the first buffer at the index location assigned to each corresponding packet;

wherein upon a failure of one or more graphics processing units, send packets to backup GPU buffers and transmit an interrupt to one or more backup graphics processing units.

29. The method of claim 28, wherein the at least one graphics processing unit is connected to the at least one network interface over a bus.

30. The method of claim 28, further comprising:
assigning, by the at least one network interface, a classification to each packet in each packet stream subset; and
inserting, by the at least one network interface, each packet in each packet stream subset into the first buffer in the memory of at least one graphics processing unit using direct memory access.

31. A system, comprising:
at least one network interface and at least one graphics processing unit communicating over a bus to execute computer-executable instructions to:
receive a plurality of packets from a network by the at least one network interface;
for each packet in the plurality of packets, analyze packet contents to determine a specific data type to which the respective packet corresponds;
filter the plurality of packets into a plurality of groups, each group based on the specific data type;
insert the plurality packets of a first group into a corresponding first buffer in memory of the at least one graphics processing unit using direct memory access;
assign each of the packets of the first group an index by the at least one network interface representing an offset indicating a location in memory of the at least one graphics processing unit;
transmit an interrupt to the at least one graphics processing unit regarding the first buffer in the least one graphics processing unit; and
start a first kernel preconfigured with packet handling code adapted to process packets of the specific data type in the at least one graphics processing unit in response to the interrupt to process the packets in the first buffer;
wherein a substantially identical set of computer-readable instructions associated with the first kernel is executed on each of the packets in the first buffer;
wherein a plurality of threads are executed on the at least one graphics processing units to process the packets in the first buffer at the index location assigned to each corresponding packet;
wherein upon a failure of one or more graphics processing units, send packets to backup GPU buffers and transmit an interrupt to one or more backup graphics processing units.

32. The system of claim 31, wherein the at least one network interface and the at least one graphics processing unit execute computer-executable instructions to:
determine that a pre-configured buffer flow capacity has been reached regarding the first buffer in the at least one graphics processing unit.

33. The system of claim 31, wherein the at least one network interface and the at least one graphics processing unit execute computer-executable instructions to:
insert the plurality packets of a first group into a corresponding second buffer in memory of the at least one graphics processing unit using direct memory access;
determine that a second pre-configured buffer flow capacity has been reached regarding the second buffer in the at least one graphics processing unit;
transmit a second interrupt to the at least one graphics processing unit corresponding to the second pre-configured buffer flow capacity regarding the second buffer in the least one graphics processing unit; and
start a second kernel preconfigured with packet handling code adapted to process packets of the specific data type in the at least one graphics processing unit in response to the second interrupt to process second packets in the second buffer;
wherein a substantially identical set of computer-readable instructions associated with the second kernel is executed on each of the packets in the second buffer;
wherein a plurality of threads are executed on the at least one graphics processing units to process the packets in the first buffer at the index location assigned to each corresponding packet.

34. The system of claim 31, wherein the at least one network interface and the at least one graphics processing unit execute computer-executable instructions to:
map each buffer in the memory of the at least one graphics processing unit to at least one interrupt.

35. The system of claim 31, wherein the at least one network interface and the at least one graphics processing unit execute computer-executable instructions to:
locate each packet in the first buffer in the memory of the at least one graphics processing unit using the index and execute the first kernel to process each packet in the first buffer by at least one thread simultaneously executing first kernel code in lockstep in the at least one graphics processing unit.

36. The system of claim 31, wherein the at least one network interface and the at least one graphics processing unit execute computer-executable instructions to:
generate by the at least one graphics processing unit output packets into an output buffer in the memory of the at least one graphics processing unit.

37. The system of claim 36, further comprising:
a storage device connected to the bus to store the output packets using a non-volatile memory host controller interface.

38. The system of claim 36, wherein the at least one network interface and the at least one graphics processing unit execute computer-executable instructions to:

notify the at least one network interface that the output packets in the output buffer in the memory of the at least one graphics processing unit are ready to transmit.

39. The system of claim 31, wherein the at least one packet is associated with at least one member of a group consisting of RADIUS authentication, Diameter processing, SSL processing, TCP/HTTP requests, SMS messaging, and SIP messaging.

40. The system of claim 31, wherein the pre-configured buffer flow capacity regarding the first buffer in the least one graphics processing unit corresponds to at least one member of a group consisting of percentage of buffer memory used in the first buffer, buffer memory remaining in the first buffer, a number of packets currently in the first buffer, an elapsed time since a first packet was received in the first buffer, and an elapsed time since a last packet was received in the first buffer.

41. The system of claim 31, wherein the bus comprises a Peripheral Component Interconnect Express bus.

42. The system of claim 31, wherein the at least one network interface and the at least one graphics processing unit execute computer-executable instructions to:
assign a classification to each of the packets; and
insert each of the packets into the first buffer in memory of the at least one graphics processing unit using direct memory access.

43. A system, comprising:
at least one network interface and at least one graphics processing unit communicating over a bus to execute computer-executable instructions to:
receive a stream of packets from a network by the at least one network interface;
split the stream of packets into at least one packet stream subset by the at least one network interface;
for each packet in the stream of packets, analyze packet contents to determine a specific data type to which the respective packet corresponds;
filter the stream of packets into a plurality of groups, each group based on the specific data type;
insert each packet of a first group into a corresponding first buffer in memory of the at least one graphics processing unit using direct memory access;
assign each packet of the first group an index by the at least one network interface representing an offset indicating a location in the memory of the at least one graphics processing unit;
transmit an interrupt to the at least one graphics processing unit regarding the first buffer in the least one graphics processing unit; and
start a first kernel preconfigured with packet handling code adapted to process packets of the specific data type in the least one graphics processing unit in response to the interrupt to process the packets in the first buffer;
wherein a substantially identical set of computer-readable instructions associated with the first kernel is executed on each of the packets in the first buffer;
wherein a plurality of threads are executed on the at least one graphics processing units to process the packets in the first buffer at the index location assigned to each corresponding packet;
wherein upon a failure of one or more graphics processing units, send packets to backup GPU buffers and transmit an interrupt to one or more backup graphics processing units.

44. The system of claim 43, wherein the at least one network interface and the at least one graphics processing unit execute computer-executable instructions to:
determine that a pre-configured buffer flow capacity has been reached regarding the first buffer in the at least one graphics processing unit.

45. The system of claim 44, wherein the at least one network interface and the at least one graphics processing unit execute computer-executable instructions to:
assign a classification to each packet in each packet stream subset by the at least one network interface; and
insert each packet in each packet stream subset into the first buffer in the memory of the at least one graphics processing unit using responsive to the classification using direct memory access.

46. A server comprising:
at least one network interface and at least one graphics processing unit communicating over a bus to execute computer-executable instructions to:
receive a stream of packets from a network by the at least one network interface;
for each packet in the stream of packets, analyze packet contents to determine a specific data type to which the respective packet corresponds;
filter the stream of packets into a plurality of groups, each group based on the specific data type;
insert each of the packets of a first group into a corresponding first buffer in memory of the at least one graphics processing unit using direct memory access;
assign each of the packets of the first group an index by the at least one network interface representing an offset indicating a location in the memory of the at least one graphics processing unit;
transmit an interrupt to the at least one graphics processing unit regarding the first buffer in the at least one graphics processing unit; and
start a first kernel preconfigured with packet handling code adapted to process packets of the specific data type in the at least one graphics processing unit in response to the interrupt to process the packets in the first buffer;
wherein a substantially identical set of computer-readable instructions associated with the first kernel is executed on each of the packets in the first buffer;
wherein a plurality of threads are executed on the at least one graphics processing units to process the packets in the first buffer at the index location assigned to each corresponding packet;
wherein upon a failure of one or more graphics processing units, send packets to backup GPU buffers and transmit an interrupt to one or more backup graphics processing units.

47. The server of claim 46, wherein the at least one network interface and the at least one graphics processing unit execute computer-executable instructions to:
determine that a pre-configured buffer flow capacity has been reached regarding the first buffer in the at least one graphics processing unit.

48. The server of claim 46, wherein the at least one network interface and the at least one graphics processing unit execute computer-executable instructions to:
assign a classification to each of the packets; and
insert each of the packets into the first buffer in the memory of the at least one graphics processing unit responsive to the classification using direct memory access.

* * * * *